July 16, 1957  N. G. BALKO ET AL  2,799,416
BOAT TRAILER
Filed Jan. 4, 1956  2 Sheets-Sheet 1
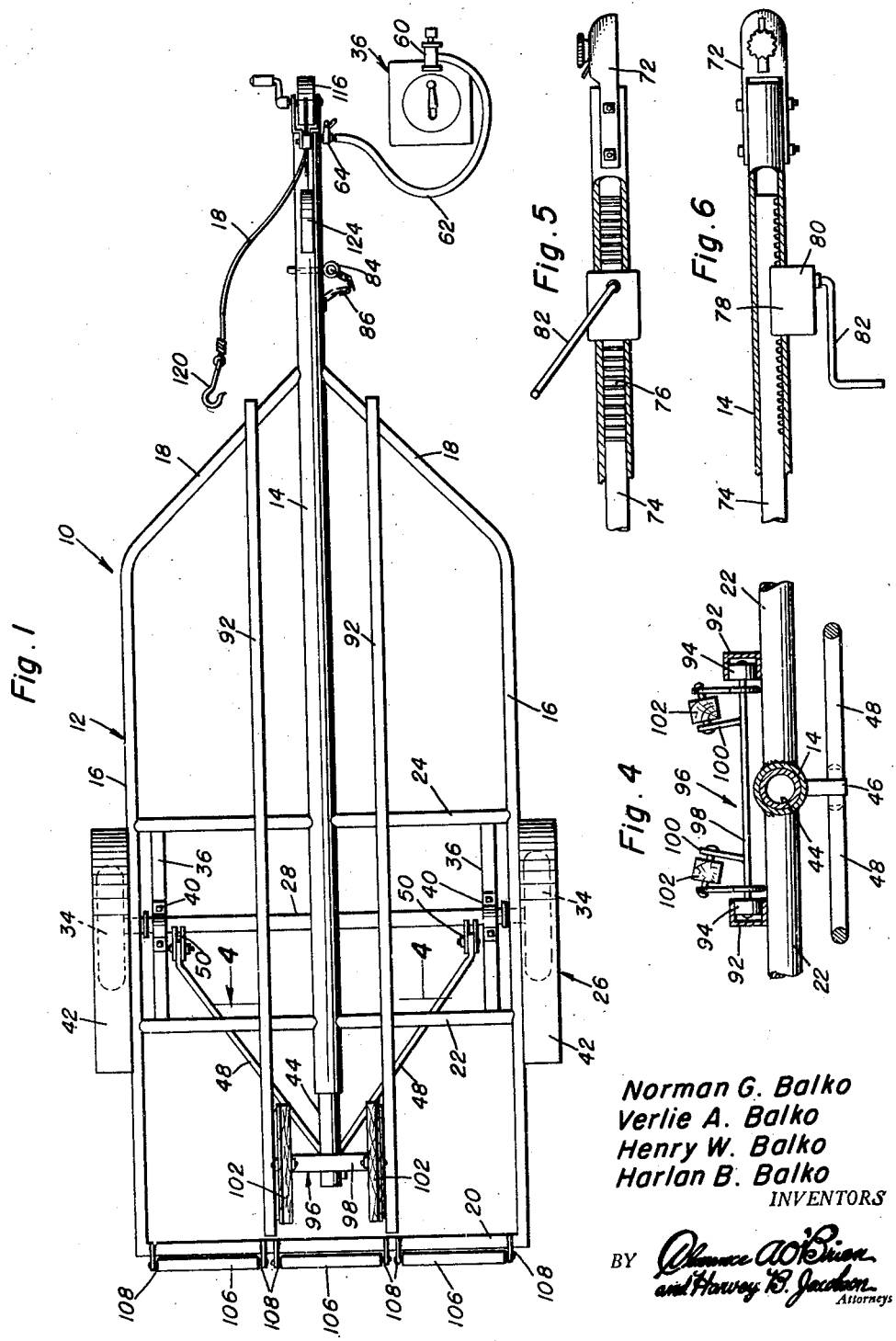
Norman G. Balko
Verlie A. Balko
Henry W. Balko
Harlan B. Balko
INVENTORS

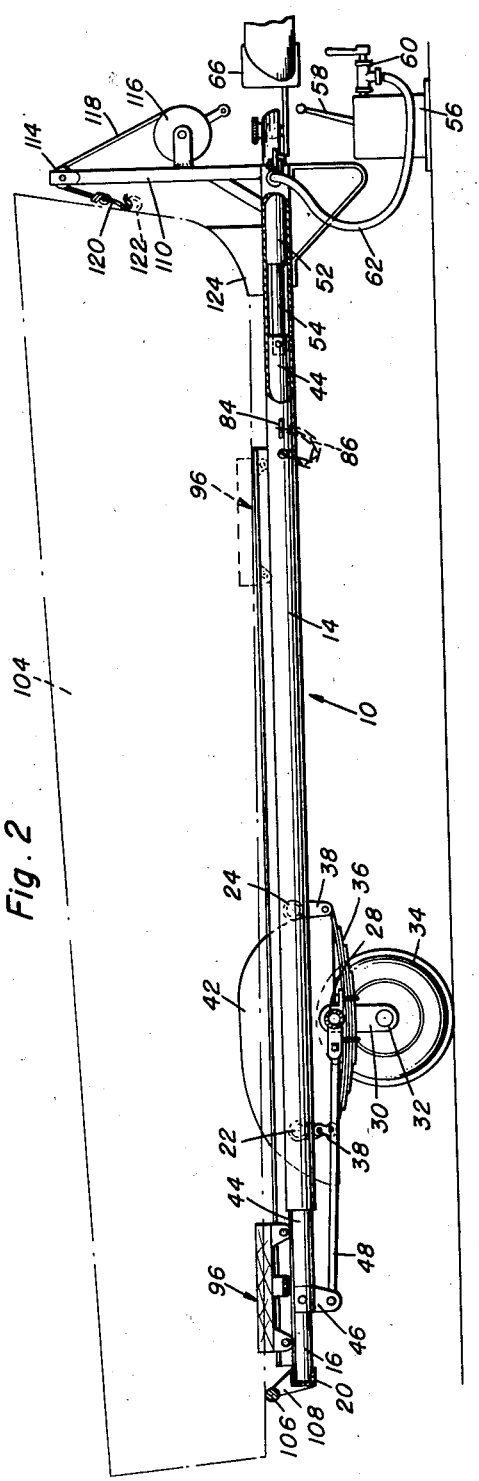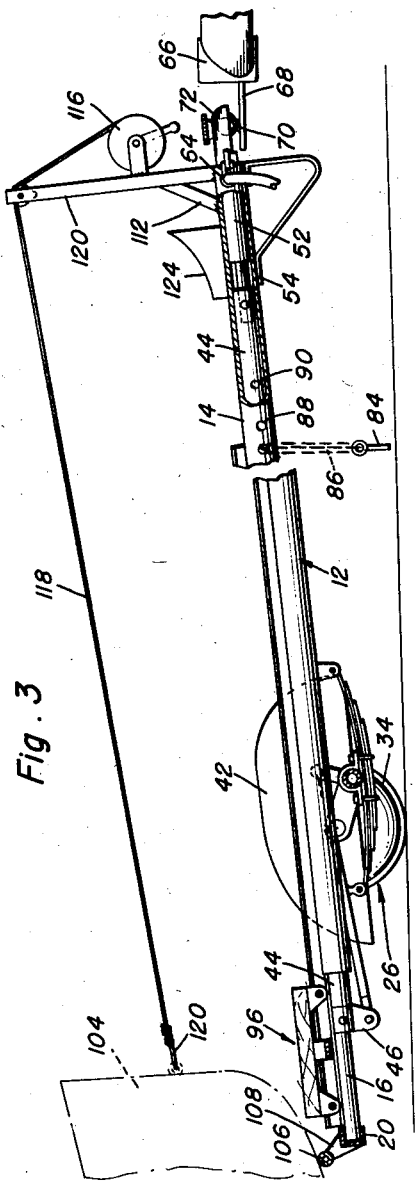

_United States Patent Office_

2,799,416
Patented July 16, 1957

2,799,416

BOAT TRAILER

Norman G. Balko, Glen Flora, and Verlie A. Balko, Henry W. Balko, and Harlan B. Balko, Ladysmith, Wis.

Application January 4, 1956, Serial No. 557,332

7 Claims. (Cl. 214—506)

This invention relates in general to new and useful improvements in trailers, and more specifically to an improved trailer intended primarily for the transportation of boats.

The major problem encountered in the construction and design of boat trailers is to provide a trailer which will have sufficient ground clearance when travelling over roads and at the same time will have a minimum ground clearance when it is designed to launch a boat therefrom in order that the trailer need not be placed into deep water in order to permit the floatation of a boat. It is therefore the primary object of this invention to provide an improved boat trailer which includes a wheel assembly so mounted with respect to the frame of the trailer whereby the frame may be selectively lowered and raised so as to vary the ground clearance of the frame.

Another problem encountered in the design of boat trailers is to provide a suitable support for a boat which will permit the ease of loading a boat and at the same time will retain the boat in a properly supported position on the trailer frame. It is therefore another object of this invention to provide an improved boat trailer which includes a frame having mounted at the rear thereof transversely arranged rollers for supporting a boat in its movement over the rear portion of the frame, and a bow supporting carriage which is slidably carried by a trackway of the frame for supporting the bow of a boat at all times when positioned over the frame of the trailer.

Still another object of this invention is to provide an improved boat trailer of the type which includes a frame having a center tow pole, the frame being supported by a wheel assembly which includes a rotatably mounted axle having offset spindles, there being carried by the tow pole means for selectively locking or rotating the axle whereby the frame may be selectively raised and lowered with respect to the ground while the wheels continue to support the frame.

A further object of this invention is to provide an improved opearator for rocking a cranked type axle for raising and lowering a frame supported by such axle, the operator being in the form of an elongated control member telescoped within a tow pole of the trailer, there being mounted in the tow pole suitable means for moving the control member in and out of the tow pole, the control member being connected by suitable linkage to the cranked axle whereby when the control member is moved longitudinally of the tow pole, the cranked axle is rotated to raise or lower the frame as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the boat trailer which is the subject of this invention and shows the general arrangements thereof, the carriage for the bow of the boat being shown in a rearmost position;

Figure 2 is a side elevational view of the boat trailer of Figure 1 and shows it coupled to a rear portion of a vehicle, there being shown in position on the boat trailer a boat, the boat being illustrated by broken lines;

Figure 3 is a side elevational view of the boat trailer of Figure 2 with an intermediate portion thereof broken away, the boat trailer having the frame thereof in a retracted position for initially receiving a boat to be loaded thereon, with the bow of a boat being illustrated;

Figure 4 is a fragmentary enlarged transverse vertical sectional ivew taken substantially upon the plane indicated by the section line 4—4 of Figure 1 and shows the details both of the control for the wheel assembly of the boat trailer and the details of the bow supporting carriage;

Figure 5 is an enlarged fragmentary side elevational view of a modified form of control for the wheel assembly of the boat trailer, a further portion of a tow pole being broken away and shown in section in order to clearly illustrate the details of the drive means for the control; and Figure 6 is an enlarged fragmentary top plan view of the modified form of drive means and shows further the details thereof, a portion of the tow pole being broken away and shown in section.

Referring now to the drawings in detail, it will be seen that there is illustrated the boat trailer which is the subject of this invention, the boat trailer being referred to in general by the reference numeral 10. The boat trailer 10 includes a frame which is best illustrated in Figure 1, the frame being referred to in general by the reference numeral 12.

The frame 12 includes an elongated tow pole 14 which terminates short of the rear of the frame. In addition to the tow pole 14, the frame 12 includes a pair of frame rails 16 which are disposed on opposite sides of the tow pole 14 and are in spaced parallel relation with respect thereto. The frame rails 16 include forwardly converging portions 18 which are suitably secured to a forward portion of the tow pole 14.

The rear portions of the frame rails 16 are connected together by a rear transverse frame member 20. Additional transverse frame members 22 and 24 extend between the frame rails 16 and the rear portion of the tow pole 14 and connect the same together.

Supporting the frame 12 is a wheel assembly which is referred to in general by the reference numeral 26. The wheel assembly 26 includes a transverse axle 28 which has secured to opposite ends thereof offset plates 30. The plates 30, as is best illustrated in Figure 2, normally depend from the axle 28 and have connected to the lower portions thereof outwardly extending spindles 32. Mounted on the spindles 32 are ground engaging wheels 34.

In order that the wheel assembly 26 may be conveniently mounted in a frame supporting position, there is provided a pair of longitudinal springs 36. Each longitudinal spring 36 is disposed adjacent to and inwardly of one of the frame rails 16. Opposite ends are connected to the transverse frame members 22 and 24 by means of suitable spring hangers 38. The axle 28 overlies the springs 36 and are rotatably journaled in suitable bearings 40 carried thereby.

In order that the wheels 34 may be protected from striking undesired objects and also to prevent the splashing due to running on wet ground or the like, there is carried by each of the frame rails 26 a fender 42. Each of the fenders 42 is received over a respective one of the wheels 34 and so clears the wheel 34 so that even when the frame 12 is in the lowered position the wheels 34 do not touch the fenders 42, as is best illustrated in Figure 3.

Extending through the tow pole 14 and projecting out of the rear end thereof is an elongated control member 44. The control member 44 is mounted within the tow pole 14 in telescoping relation for sliding movement relative thereto. Connected to the rear portion of the control member 44 by means of a suitable fitting 46 is a pair of links 48 whose forward ends are pivotally connected to a pair of ear assemblies 50 secured to the axle 28.

Referring now to Figure 2 in particular, it will be seen that when the frame 12 is in an elevated position, the control member 44 is substantially retracted within the tow pole 14. On the other hand, when the control member 44 is moved forwardly with respect to the tow pole 14, the links 48 rotate or rock the axle 28 with the result that the wheels 34 are swung rearwardly and upwardly with respect to the frame 12. Inasmuch as the wheels 34 remain in engagement with the ground at all times, actually the frame 12 has the rear portion thereof lowered, as is best illustrated in Figure 3.

It is to be understood that the weight of the trailer 10 is such that the frame 12 will assume the position of Figure 3 by gravity. It is therefore necessary only to provide suitable means for pushing the control member 44 rearwardly from the position illustrated in Figure 3 to the position illustrated in Figure 2 to effect the raising of the frame 12. A preferred means for accomplishing this is in the form of a hydraulic motor 52 which is mounted within the forward end of the tow pole 14. The hydraulic motor 52 includes a plunger 54 which is connected to the forward end of the control member 44.

In order to operate the hydraulic motor 52, there is provided a hydraulic pump assembly 56. The hydraulic pump assembly 56 is portable and includes an operating lever 58. The hydraulic pump assembly 56 also includes a control valve 60 for controlling the flow of hydraulic fluid from the hydraulic motor 52 back into the pump 56, the pump 56 including a self contained reservoir. Connecting the valve 60 to the hydraulic motor 52 is a fluid line 62. The fluid line 62 is connected to the fluid motor 52 by means of a quick releasable coupling 64 which permits the pump assembly 56 to be completely removed from the trailer 10 without the loss of hydraulic fluid.

Referring now to Figures 2 and 3 in particular, it will be seen that there is illustrated a rear portion of a vehicle 66. The vehicle 66 has secured thereto a tow bar 68 carrying a ball 70. Connected to the forward end of the tow pole 14 is a hitch 72 which is engaged over the ball 70 thus coupling the trailer 10 to the vehicle 66. If desired, the pump assembly 56 may be mounted in the trunk (not shown) of the vehicle 66 and thus be concealed and readily carried and at the same time be available for immediate use.

Referring now to Figures 5 and 6, it will be seen that there is illustrated the forward end of a modified form of control member which is referred to in general by the reference numeral 74. The control member 74 differs from the control member 44 in that the forward end thereof has formed on one side thereof an elongated rack 76. Engaged with the rack 76 is a gear 78 of the drive unit 80. The drive unit 80 is carried by the tow pole 14 and includes a crank 82 for driving the gear 78. By rotating the crank 82, the control member 74 may be in or out of the tow pole 14 as desired to effect the raising and lowering of the frame 12 in the manner described heretofore.

In order that the control member 44 may be retained in an adjusted position within the tow pole 14, there is carried by the tow pole 14 a pin 84. The pin 84 is mounted on a chain 86 which has one end thereof anchored to the tow pole 14. The tow pole 14 is provided with a bore 88 which is selectively alignable with a bore 90 formed in the forward portion of the control member 44. When the frame 12 is in a horizontal position, such as that illustrated in Figure 2, the bores 88 and 90 are aligned and the pin 84 may be placed therethrough to prevent the accidental movement of the control member 44 when the trailer 10 is in transit. While it has not been so illustrated, a similar lock means may be provided for the control member 74.

In order to facilitate the mounting of a boat on the trailer 10 and the loading and unloading of such boat, there is carried by the frame 12 a trackway which includes a pair of transversely spaced, longitudinally extending, parallel track members 92 which are channel shaped in cross section, the track members 92 being in opposed relation. The track members 92 extend substantially the full length of the frame 12 and have engaged therewith for guided movement therein wheels 94 of a bow supporting carriage which is referred to in general by the reference numeral 96. The carriage 96 includes a suitable frame 98 which carries the wheels 94. Extending upwardly from the central portion of the frame 98 are arms 100 which have pivotally thereon intermediate portions of longitudinally extending blocks 102. The blocks 102 are engageable with the bow of a boat, such as the boat 104 for supporting the forward portion of the boat 104 above the frame 12.

Carried by the rear transverse frame member 20 is a plurality of longitudinally aligned rollers 106. The rollers 106 are mounted on the rear transverse frame member 20 by means of suitable supports 108.

Extending upwardly from the forward portion of the tow pole 14 is a standard 110. The standard 110 is braced by a suitable brace 112 and supports adjacent the upper end thereof a pulley 114. Mounted on the standard 110 intermediate the ends thereof is a winch 116. Carried by the winch 116 is a cable 118 which is entrained over the pulley 114 and terminates in hook 120. The hook 120 is selectively engageable in an eye 122 in the bow of the boat 104.

When it is desired to load the boat 104 on the trailer 10, the trailer 10 is moved into shallow water and the frame 12 thereof is permitted to move down towards the ground to the position illustrated in Figure 3. Then with the carriage 96 in its rearmost position, the boat 104 is pulled forwardly until the bow thereof rides over the rollers 106. The bow of the boat 104 will then settle on the carriage 96 and be supported thereby. The boat 104 is pulled onto the trailer 10 by means of the cable 118 through the use of the winch 116. As the weight of the bow of the boat 104 settles upon the carriage 96, the carriage 96 will move forward with the boat 104 supporting the forward portion thereof. The boat 104 is pulled forwardly by means of the winch 116 until the bow thereof seats upon a suitable seat member 124 for the bow, the seat member 124 being carried by the forward portion of the tow pole 14. At this time the forward portion of the boat 104 is supported by the carriage 96 and the stern of the boat 104 is supported by the rollers 106.

Inasmuch as the trailer 10 slips downwardly and rearwardly when the frame 12 thereof is lowered, when it is desired to unload the boat 104, it is merely necessary to lower the frame 12. Then by permitting the cable 118 to pay out, the boat 104 by its own weight will slide rearwardly off of the trailer 10 into the desired body of water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member.

2. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member, said drive means including a hydraulic motor mounted within said tow pole.

3. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member, said drive means including a hydraulic motor mounted within said tow pole, and a portable pressure fluid source mounted externally of said tow pole and connected to said hydraulic motor.

4. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member, said drive means including a rack on said control member, and a drivable gear on said tow pole engaged with said rack.

5. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member, a longitudinal trackway on said frame, carriage for receiving a bow of a boat guidedly retained on said trackway, and means on said frame for moving said carriage along said trackway.

6. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole, link means connecting said axle to said control member for rotating said axle in response to movement of said control member through said tow pole whereby said frame is selectively raised and lowered, drive means connected to said tow pole for selectively moving and positioning said control member, a longitudinal trackway on said frame, carriage for receiving a bow of a boat guidedly retained on said trackway, means on said frame for moving said carriage along said trackway, and a plurality of transversely disposed rollers at the rear of said frame cooperating with said carriage to support a boat on said frame.

7. A trailer construction comprising a frame, a wheel assembly supporting said frame, said wheel assembly including an axle having offset spindles, wheels rotatably carried by said spindles, means mounting said axle for rotation, said frame including a central tow pole terminating adjacent said axle, a control member slidably telescoped in said tow pole and extending out of the rear thereof, link means connecting said axle to said control member for rotating said axle in response to the movement of said control member through said tow pole whereby said frame is selectively raised and lowered, drive means carried by a forward portion of said tow pole and engaged with said control member for selectively moving and positioning said control member.

References Cited in the file of this patent

UNITED STATES PATENTS

| | | |
|---|---|---|
| 2,487,701 | Getz | Nov. 8, 1949 |
| 2,558,418 | Brueckman | June 26, 1951 |
| 2,636,745 | Cartwright | Apr. 28, 1953 |
| 2,711,259 | Jones | June 21, 1955 |
| 2,733,823 | Evans | Feb. 7, 1956 |
| 2,740,639 | Eckroad | Apr. 3, 1956 |